US010677630B2

(12) United States Patent
Pankratz et al.

(10) Patent No.: US 10,677,630 B2
(45) Date of Patent: Jun. 9, 2020

(54) VIBRATING METER WITH A SYNTHETICALLY WRAPPED CASE

(75) Inventors: Anthony William Pankratz, Arvada, CO (US); Joel Weinstein, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 837 days.

(21) Appl. No.: 14/373,701

(22) PCT Filed: Feb. 6, 2012

(86) PCT No.: PCT/US2012/023976
§ 371 (c)(1),
(2), (4) Date: Jul. 22, 2014

(87) PCT Pub. No.: WO2013/119198
PCT Pub. Date: Aug. 15, 2013

(65) Prior Publication Data
US 2015/0211907 A1     Jul. 30, 2015

(51) Int. Cl.
*G01F 15/14* (2006.01)
*G01F 1/84* (2006.01)

(52) U.S. Cl.
CPC .............. *G01F 15/14* (2013.01); *G01F 1/84* (2013.01); *G01F 1/8413* (2013.01); *G01F 1/8477* (2013.01); *Y10T 29/49826* (2015.01); *Y10T 29/49874* (2015.01)

(58) Field of Classification Search
CPC ................ G01F 1/8413; G01F 1/8418; G01F 1/8468–8477; G01F 15/14
See application file for complete search history.

(56) References Cited

U.S. PATENT DOCUMENTS

| 5,731,527 | A | * | 3/1998 | Van Cleve | ............ | G01F 1/8477 |
| | | | | | | 138/172 |
| 6,286,373 | B1 | * | 9/2001 | Lister | .................... | G01F 1/8409 |
| | | | | | | 439/709 |
| 8,789,428 | B2 | * | 7/2014 | Schuker | .................... | G01F 1/80 |
| | | | | | | 73/861.355 |
| 2010/0005906 | A1 | * | 1/2010 | Shimizu | ................ | G01F 1/8413 |
| | | | | | | 73/861.357 |
| 2013/0086987 | A1 | * | 4/2013 | Lanham | ................ | G01F 1/8413 |
| | | | | | | 73/662 |

FOREIGN PATENT DOCUMENTS

| JP | 06-075741 U | 10/1994 | | |
| WO | 9812510 A1 | 3/1998 | | |
| WO | 2012005734 A1 | 1/2012 | | |
| WO | WO 2012005734 A1 | * | 1/2012 | ........... G01F 1/8413 |

* cited by examiner

*Primary Examiner* — Xin Y Zhong
(74) *Attorney, Agent, or Firm* — The Ollila Law Group LLC (57) ABSTRACT

A sensor assembly (10) of a vibrating meter (5) is provided. The sensor assembly (10) comprises one or more fluid conduits (103A, 103B). The sensor assembly (10) also includes a case (200) surrounding at least a portion of the one or more fluid conduits (103A, 103B). A synthetic wrap (300) is applied to at least a portion of the case (200).

14 Claims, 5 Drawing Sheets

VIBRATING METER WITH A SYNTHETICALLY WRAPPED CASE

TECHNICAL FIELD

The embodiments described below relate to, vibrating meters, and more particularly, to a vibrating meter with a synthetically wrapped case.

BACKGROUND OF THE INVENTION

Vibrating meters such as, for example, densitometers, volumetric flow meters, and Coriolis flow meters are used for measuring one or more characteristics of substances, such as, for example, a density, a mass flow rate, a volume flow rate, a totalized mass flow, a temperature, and other information. Vibrating meters include one or more conduits, which may have a variety of shapes, such as, for example, straight, U-shaped, or irregular configurations. The one or more conduits provide a primary containment of the measured fluid. The measured fluid may comprise a liquid, a gas, or a combination thereof. The liquid may include suspended particulates.

The one or more conduits have a set of natural vibration modes, including, for example, simple bending, torsional, radial, and coupled modes. The one or more conduits are vibrated by at least one driver at a resonance frequency in one of these modes, hereinafter referred to as the drive mode, for purposes of determining a characteristic of the substance. One or more meter electronics transmit a sinusoidal driver signal to the at least one driver, which is typically a magnet/coil combination, with the magnet typically being affixed to the conduit and the coil being affixed to a mounting structure or to another conduit. The driver signal causes the driver to vibrate the one or more conduits at the drive frequency in the drive mode. For example, the driver signal may be a periodic electrical current transmitted to the coil.

One or more pick-offs detect the motion of the conduit(s) and generate a pick-off signal representative of the motion of the vibrating conduit(s). The pick-off is typically a magnet/coil combination, with the magnet typically being affixed to one conduit and the coil being affixed to a mounting structure or to another conduit. The pick-off signal is transmitted to the one or more electronics; and according to well-known principles, the pick-off signal may be used by the one or more electronics to determine a characteristic of the substance or adjust the driver signal, if necessary.

Generally, the conduits as well as the driver and pick-offs are enclosed within a case. The case can provide numerous benefits, such as protection of the internal components as well as offer a secondary containment of the fluid if the fluid conduits develop a crack, for example. In order for the case to provide adequate secondary containment, the burst pressure (pressure at which a component fails) of the case should be at least as high as the operating pressure of the wetted fluid path (fluid conduits, manifold, flange, etc.). Many of the vibrating meters currently on the market have a wetted fluid path with a burst pressure of around 15,000 psi (1,034 bar); however, this number may vary depending on the material used for the wetted fluid path, the size of the meter, etc. A pressure rating for the wetted fluid path can then be assigned by a regulatory or safety agency based on the burst pressure or some other analytic equation. The secondary containment pressure rating typically includes a safety factor such that the rated pressure is below the actual burst pressure. For example, the American Society of Mechanical Engineers (ASME) currently implements a safety factor of about six to ten, depending on material properties, and the welding methods employed. Therefore, for a wetted fluid path having a burst pressure of around 15,000 psi (1,034 bar), the ASME pressure rating, assuming a safety factor of ten, is only 1,500 psi (103 bar). Due in part to the conservative pressure ratings of regulatory agencies, the burst pressure of the case must also increase drastically to provide approved secondary containment. This extreme increase in the case's burst pressure is problematic, especially when considering that the diameter of the case will always be much greater than the diameter of the wetted path components.

In order to understand how to increase the pressure rating of the case, the case can be characterized as a thin-walled, cylindrical-shaped component where the pressure within the case acts against the walls of the case creating a hoop stress. Hoop stress can be characterized by equation (1).

$$\sigma = \frac{P * ID}{2t} \quad (1)$$

Where:
σ is the hoop stress;
P is the internal pressure;
ID is the internal diameter of the case; and
t is the case thickness.

Other stresses also exist, such as an axial stress, however hoop stress is the largest and therefore the most relevant to choosing a minimum thickness. In many situations, the maximum allowable hoop stress is governed by regulatory agencies or other safety standards. As can be appreciated from equation (1), one approach to maintaining an acceptable hoop stress while allowing for a higher pressure would be to decrease the internal diameter of the case. However, this approach is rarely possible without also decreasing the size of the fluid conduits. Another approach would be to increase the case thickness. The case is often formed from a metal such as stainless steel or carbon steel; although, other materials may be used, such as plastic. In relatively smaller meter sizes, i.e., less than about 1 inch (2.54 cm) internal conduit diameter, the standard case is often strong enough to provide adequate secondary containment for the fluid or alternatively, providing extra thickness to the steel case is reasonable and relatively inexpensive. As can be appreciated, as the conduit diameter increases, the case size typically also increases. Consequently, in vibrating meters that include conduit sizes greater than an approximately 1 inch (2.54 cm) internal diameter, the case's ability to contain the fluid pressure upon a conduit failure is diminished and increasing the thickness of the case has serious drawbacks. For example, some large flow rate vibrating meters can have cases with an internal diameter of 10 inches (25.4 cm) or more. Meters of this size are often seen in the oil and gas industry where secondary containment is becoming more important. Cases of this dimension often have a burst pressure of around 860 psi (59.3 bar), many times below the wetted path burst pressure of 15,000 psi (1,034 bar). With dimensions of this magnitude, the case would require a thickness of about 2 inches (5.08 cm), resulting in a case weight of over 2,000 pounds (908 kg) in order to have a burst pressure of 15,000 psi (1,034 bar). As can be appreciated, such an approach results in an excessive cost and weight for the vibrating meter case.

Due in part to the high cost and weight associated with increasing the thickness of the case, the cases used in the prior art for these larger meters were provided simply to protect the conduits and electrical components of the vibrating meter, but did not provide acceptable secondary fluid containment. This created a situation where a conduit failure would almost immediately result in a case failure. Due to ongoing safety concerns in addition to recent oil spills, chemical spills, and environmental concerns, there is increased demand to ensure that the cases of vibrating meters provide a secondary containment if a fluid conduit fails.

The embodiments described below overcome these and other problems and an advance in the art is achieved. The embodiments described below provide a case with a synthetic wrap applied around at least a portion of the case. The synthetic wrap can dramatically increase the burst pressure of the case while minimizing the added weight and effect on the case's vibrational frequencies.

SUMMARY OF THE INVENTION

A sensor assembly of a vibrating meter is provided according to an embodiment. The sensor assembly comprises one or more fluid conduits and a case surrounding at least a portion of the one or more fluid conduits. According to an embodiment, the sensor assembly further comprises a synthetic wrap applied to at least a portion of the case.

A method for forming a sensor assembly of a vibrating meter is provided according to an embodiment. The sensor assembly includes one or more fluid conduits. According to an embodiment, the method comprises a step of surrounding at least a portion of the one or more fluid conduits with a case. According to an embodiment, the method further comprises a step of applying a synthetic wrap to at least a portion of the case.

Aspects

According to an aspect, a sensor assembly of a vibrating meter comprises:
one or more fluid conduits;
a case surrounding at least a portion of the one or more fluid conduits; and
a synthetic wrap applied to at least a portion of the case.

Preferably, the synthetic wrap is applied to substantially the entire outer surface of the case.

Preferably, the synthetic wrap comprises a synthetic fiber.

Preferably, fibers of the synthetic wrap are oriented to adjust one or more vibrational frequencies of the case.

Preferably, the synthetic wrap comprises two or more different synthetic fibers.

Preferably, the synthetic wrap is applied at a first thickness to a first portion of the case and at least a second thickness to at least a second portion of the case.

According to another aspect, a method for forming a sensor assembly of a vibrating meter including one or more fluid conduits comprises steps of:
surrounding at least a portion of the one or more fluid conduits with a case; and
applying a synthetic wrap to at least a portion of the case.

Preferably, the step of applying the synthetic wrap comprises applying the synthetic wrap to substantially the entire outer surface of the case.

Preferably, the synthetic wrap comprises a synthetic fiber.

Preferably, the step of applying the synthetic wrap comprises orienting the fibers of the synthetic wrap to adjust one or more vibrational frequencies of the case.

Preferably, the synthetic wrap comprises two or more different synthetic fibers.

Preferably, the step of applying the synthetic wrap comprises pre-tensioning the synthetic wrap.

Preferably, the step of applying the synthetic wrap comprises applying more than one layer of the synthetic wrap.

Preferably, the step of applying the synthetic wrap comprises applying the synthetic wrap at a first thickness to a first portion of the case and at least a second thickness to at least a second portion of the case.

DETAILED DESCRIPTION OF THE INVENTION

FIGS. 1-5 and the following description depict specific examples to teach those skilled in the art how to make and use the best mode of embodiments of a vibrating meter with a wrapped case. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the vibrating meter. As a result, the embodiments described below are not limited to the specific examples described below, but only by the claims and their equivalents.

Figure 1:
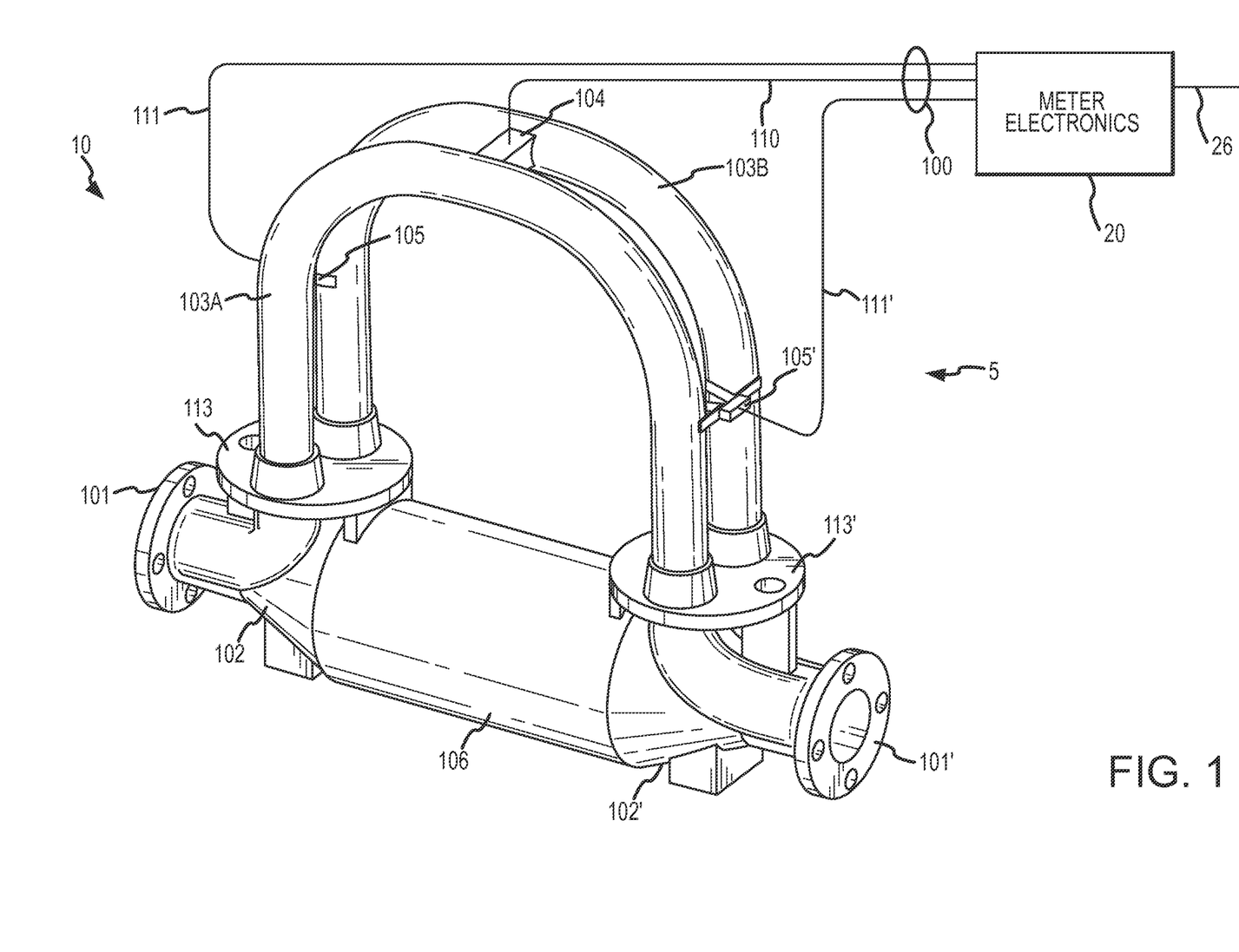
FIG. 1 shows a vibrating meter according to an embodiment.

FIG. 1 shows a vibrating meter 5 in the form of a meter comprising a sensor assembly 10 and one or more meter electronics 20. The vibrating meter 5 may comprise a Coriolis flow meter, a volumetric flow meter, a densitometer, etc. The meter electronics 20 is connected to the sensor assembly 10 via leads 100 to measure a characteristic of a substance, such as, for example, a fluid density, mass flow rate, volume flow rate, totalized mass flow, temperature, and other information over path 26.

The sensor assembly 10 of the present example includes a pair of flanges 101, 101'; manifolds 102, 102'; mounting plates 113, 113'; a driver 104; pick-offs 105, 105'; and conduits 103A, 103B. The driver 104 and pick-offs 105, 105' are coupled to the fluid conduits 103A and 103B. The driver 104 is shown affixed to the fluid conduits 103A, 103B in a position where the driver 104 can vibrate a portion of the conduits 103A, 103B in a drive mode. The pick-offs 105, 105' are affixed to the conduits 103A, 103B in order to detect motion of the conduits 103A, 103B.

It should be appreciated by those skilled in the art that it is within the scope of the present invention to use the principles discussed herein in conjunction with any type of vibrating meter, including vibrating meters that lack the measurement capabilities of a Coriolis flow meter. Examples of such devices include vibrating densitometers, volumetric flow meters, etc.

Flanges 101, 101' of the present example are coupled to manifolds 102, 102'. Manifolds 102, 102' of the present example are affixed to opposite ends of the spacer 106. The spacer 106 maintains the spacing between the manifolds 102, 102' to prevent undesired vibrations in conduits 103A, 103B. When the sensor assembly 10 is inserted into a pipeline system (not shown) which carries the substance, the substance enters sensor assembly 10 through the flange 101, passes through the inlet manifold 102 where the total amount of material is directed to enter the conduits 103A, 103B, flows through the conduits 103A, 103B, and back into the outlet manifold 102' where it exits the sensor assembly 10 through the flange 101'.

As can be appreciated, the fluid within the conduits 103A, 103B is often at an elevated temperature and may be hazardous to the environment. Further, it is often difficult to detect cracks that may be developing in the fluid conduits 103A, 103B until it is too late. Therefore, the sensor assembly 10 often includes a case 200.

Figure 2:
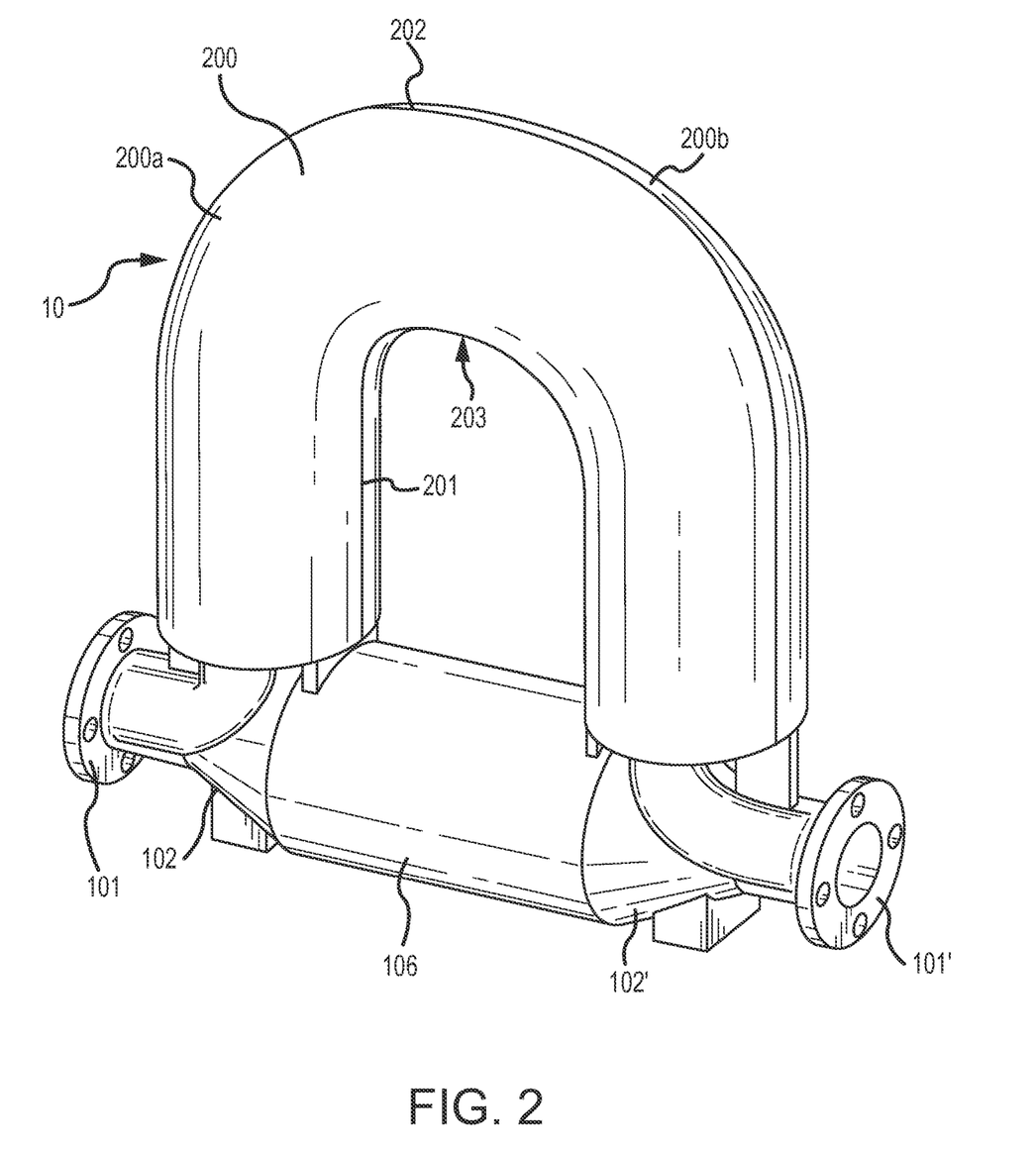
FIG. 2 shows the sensor assembly with a case according to an embodiment.

FIG. 2 shows the sensor assembly 10 with the case 200 surrounding the fluid conduits 103A, 103B, the driver 104, and the pick-offs 105, 105'. Although the embodiment shown has the case 200 completely surrounding the conduits 103A, 103B, in other embodiments, the case 200 may only surround a portion of the conduits 103A, 103B. For example, the case 200 could surround only the portion of the conduits 103A, 103B where the driver 104 and pick-offs 105, 105' are located. As can be appreciated, the case 200 may include one or more electrical feedthrus for the leads 100. The case can surround the fluid conduits 103A, 103B along with other desired components of the sensor assembly 10. Often, the case 200 is made from a metal, such as stainless steel; however, other materials may be used. The case 200 is generally coupled to the manifolds 102, 102' via the plates 113, 113', which are more visible in FIG. 1. For example, the case 200 may be welded to the plates 113, 113'. In some embodiments, the plates 113, 113' may comprise a portion of the case 200 and thus, comprise a part of the secondary containment of the sensor assembly 10. In many embodiments, the case 200 comprises two case halves 200a, 200b, which are brought together to surround the fluid conduits 103A, 103B and welded or otherwise coupled together. In the embodiment shown in FIG. 2, the inner and outer weld lines 201, 202 can be seen. According to an embodiment, the case 200 includes a bend region 203. The bend region 203 substantially matches the bend in the fluid conduits 103A, 103B, which can be seen in FIG. 1. However, it should be appreciated that if the fluid conduits 103A, 103B comprised straight fluid conduits, the case 200 could likewise be formed as a straight component without requiring the bend region 203.

According to an embodiment, the case 200 as shown in FIG. 2 has a burst pressure that is lower than the burst pressure of the wetted fluid path. In other words, if a crack developed in the wetted fluid path, the case 200 would likewise fail due to pressure resulting in a potentially disastrous situation. Therefore, the case 200 shown in FIG. 2 does not provide adequate secondary containment. Simply increasing the case's thickness in order to increase the case's burst pressure is often not a viable option as discussed above due to the excessive weight and cost associated with the approach.

Figure 3:
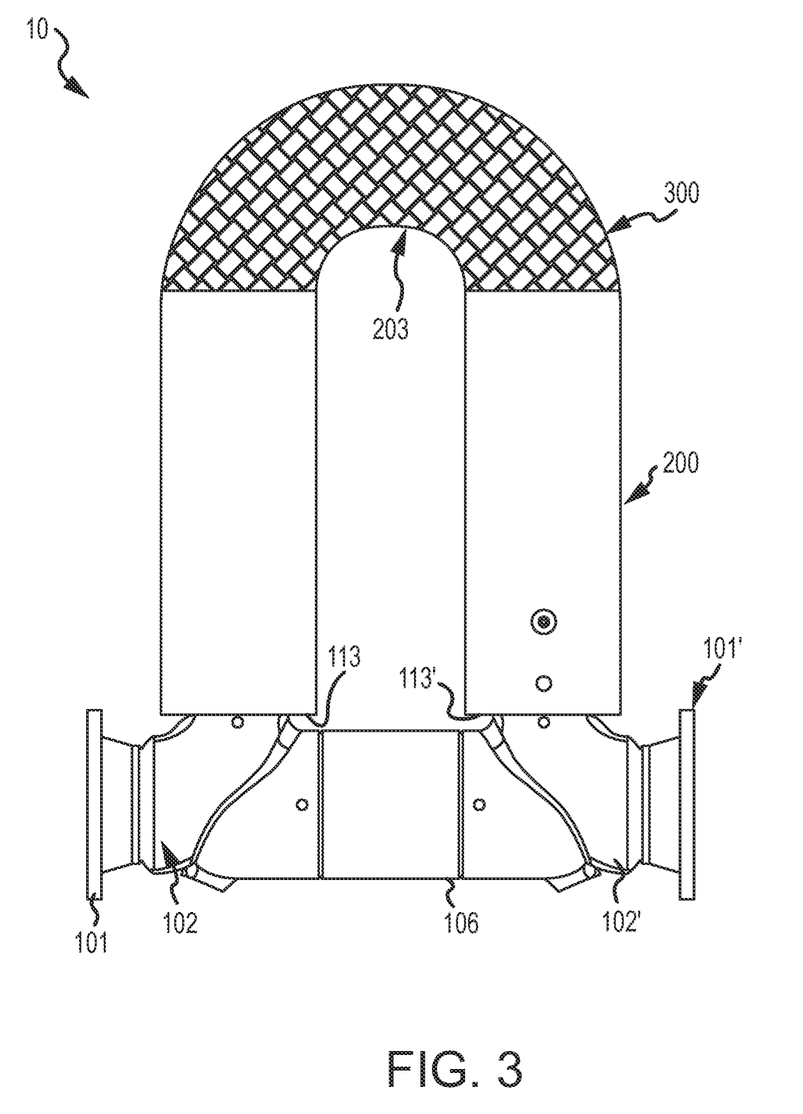
FIG. 3 shows the sensor assembly with a synthetic wrapping a portion of the case according to an embodiment.

FIG. 3 shows the sensor assembly 10 according to another embodiment. In the embodiment shown in FIG. 3, the sensor assembly 10 includes a synthetic wrap 300 that is applied around a portion of the case 200. The synthetic wrap 300 may comprise a synthetic fiber material such as fiberglass, metallic fiber, or carbon fiber, for example. In the embodiment shown in FIG. 3, the synthetic wrap 300 is only applied to the top portion of the case 200 near the bend region 203. In many situations where the case 200 includes the bend region 203, the bend region 203 is often the weakest point in the case 200. Consequently, the bend region 203 is often the first portion of the case to burst under pressure. Therefore, in the embodiment shown in FIG. 3, this is the only portion of the case 200 wrapped in the synthetic wrap 300.

According to an embodiment, the synthetic wrap 300 may comprise one or more sheets of the synthetic material that can be applied around the case 200 in one or more layers. More layers can be used in locations that require additional reinforcement for purposes of pressure containment. The sheets may comprise standard strips that can be wrapped one or more times around the case 200 or may comprise pre-fit sheets sized and shaped specifically for the particular case 200. In between the individual layers of the synthetic material, an adhesive may be used to hold the layers of the synthetic wrap 300 together. In some embodiments, the adhesive may comprise a portion of the wrap 300. For example, one side of the wrap 300 may include an adhesive that is provided by the manufacturer of the synthetic wrap 300. As another alternative, the synthetic material may comprise a single sheet that is continuously wrapped one or more times around the case 200 and held at the ends with an adhesive. Those skilled in the art can readily recognize alternative methods for applying the synthetic wrap 300 such as mechanical fasteners, a friction fit, etc. Therefore, the particular method disclosed should in no way limit the scope of the present embodiment.

According to an embodiment, the synthetic wrap 300 comprises a synthetic fiber. As can be appreciated, many synthetic fibers, such as carbon fiber, have a high strength to weight ratio. Generally, the synthetic fibers have a higher strength to weight ratio than stainless steel, for example. Consequently, using synthetic fibers as the synthetic wrap 300 can increase the burst pressure of the portion of the case 200 wrapped in the synthetic wrap 300 without adding much weight. Often, the weight added by the synthetic wrap 300 is much less than if the thickness of the metal used to form the case 200 were increased in an attempt to increase the burst pressure. As those skilled in the art will readily recognize, adding strength to the case 200 without significantly adding weight to the case 200 can maintain or increase the natural vibrational frequencies of the case 200. In contrast, if the thickness of the metal case 200 were increased, the added weight would likely decrease the natural vibrational frequencies, which may be undesirable in some embodiments.

It would also be possible to increase the cantilever-type bend mode frequencies of the case by intentionally adding extra wraps, and therefore extra stiffness, to the lower portion of the case near plates 113, 113'. This technique would add extra stiffness to the case in a location of high modal strain energy, thus raising the first few cantilever-type bend mode frequencies appreciably. While this technique would also add mass to the case, it would not be added in a location of high modal displacement, and therefore would not appreciably lower the frequencies of the first few bending modes of the case. Alternatively, if a reduction in case bending mode frequencies were desired, this could be accomplished by adding additional wraps, and thus additional mass, near the top of the case 203 at a location of high modal displacement, where the mass would have a significant lowering effect on case frequencies.

Although the embodiment shown in FIG. 3 shows the synthetic wrap 300 applied around an outer surface of the case 200, it should be appreciated that in alternative embodiments, the synthetic wrap 300 may be applied on an inner surface of the case 200. However, applying the synthetic wrap 300 to the inner surface of the case 200 is generally more difficult and may require a larger case to accommodate fluid conduits of a given size based on the thickness of the wrap 300. Therefore, in the embodiments shown and discussed, the synthetic wrap 300 is provided on an outer surface of the case 200, but the claims should not be limited to this configuration.

Figure 4:
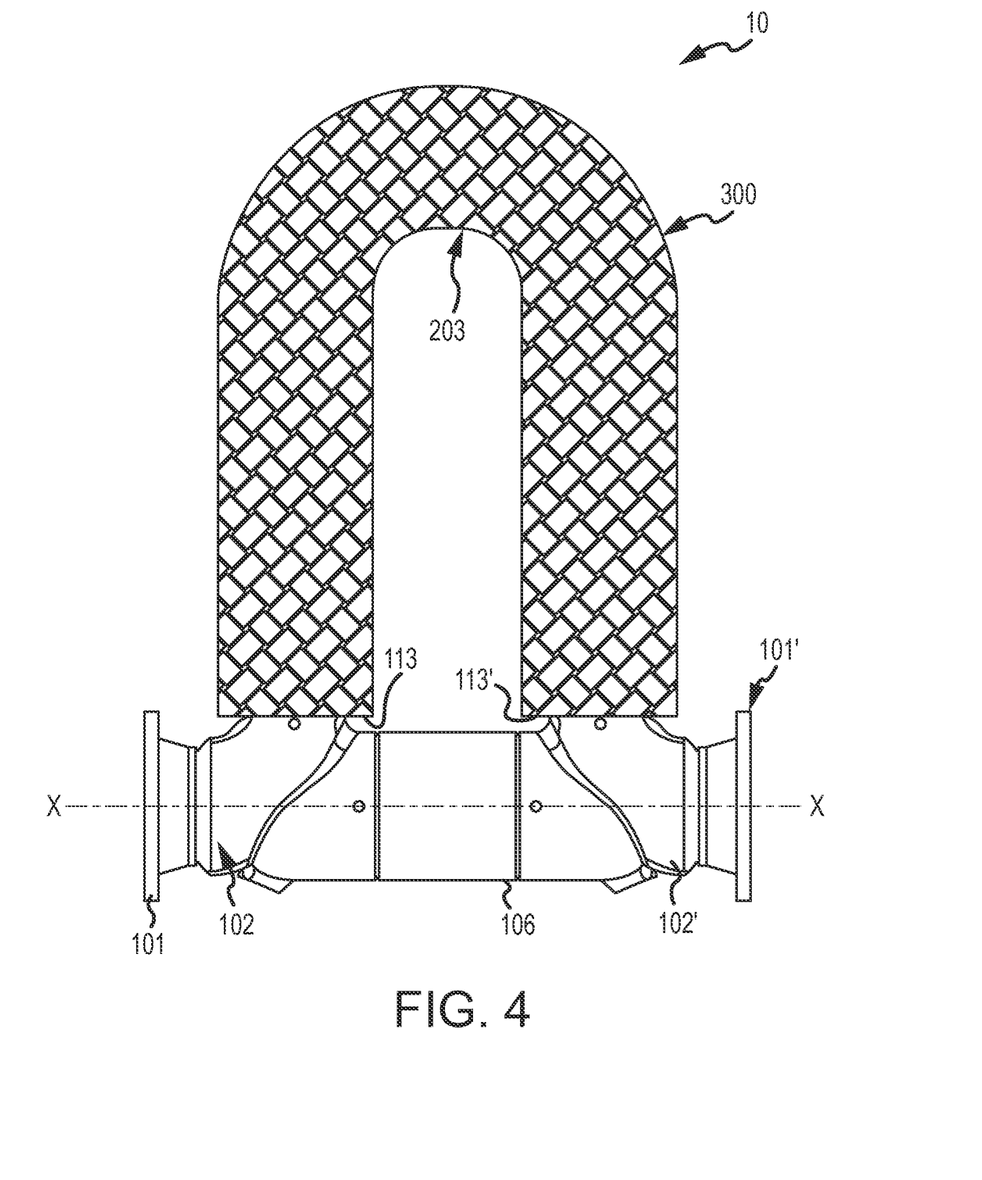
FIG. 4 shows the sensor assembly with the synthetic wrapping the entire outer surface of the case according to an embodiment.

FIG. 4 shows the sensor assembly 10 according to another embodiment. In the embodiment shown in FIG. 4, the outer surface of the case 200 is substantially completely wrapped with the synthetic wrap 300. In some embodiments, the synthetic wrap 300 may also be applied to the mounting plates 113, 113' or other portions of the sensor assembly 10, for example the manifolds 102, 102', to ensure sufficient burst pressure protection. The synthetic wrap 300 may be applied to the case 200 in substantially the same way as described above in FIG. 3, for example. As can be appreciated by applying the synthetic wrap 300 to substantially the entire outer surface of the case 200, the burst pressure can be raised further compared to the embodiment shown in FIG. 3, which only covers a portion of the case 200 with the synthetic wrap 300. Therefore, as those skilled in the art will appreciate, as the amount of coverage of the synthetic wrap 300 increases, the burst pressure of the case should likewise increase. The burst pressure of the case can be further increased by increasing the thickness of the synthetic wrap 300. For example, the burst pressure of the case mentioned above with an original burst pressure of around 860 psi (59.3 bar) can be increased to have a burst pressure around 5,000 psi (345 bar) by wrapping substantially the entire case 200 with the synthetic wrap 300 to a thickness of about ¼" (0.64 cm). The thickness of the synthetic wrap 300 may be increased by increasing the thickness of an individual sheet of the synthetic wrap 300 or by applying multiple layers of the synthetic wrap 300. The burst pressure can also be increased by using a stronger synthetic material. For example, carbon fiber is generally stronger than fiber glass.

Figure 5:
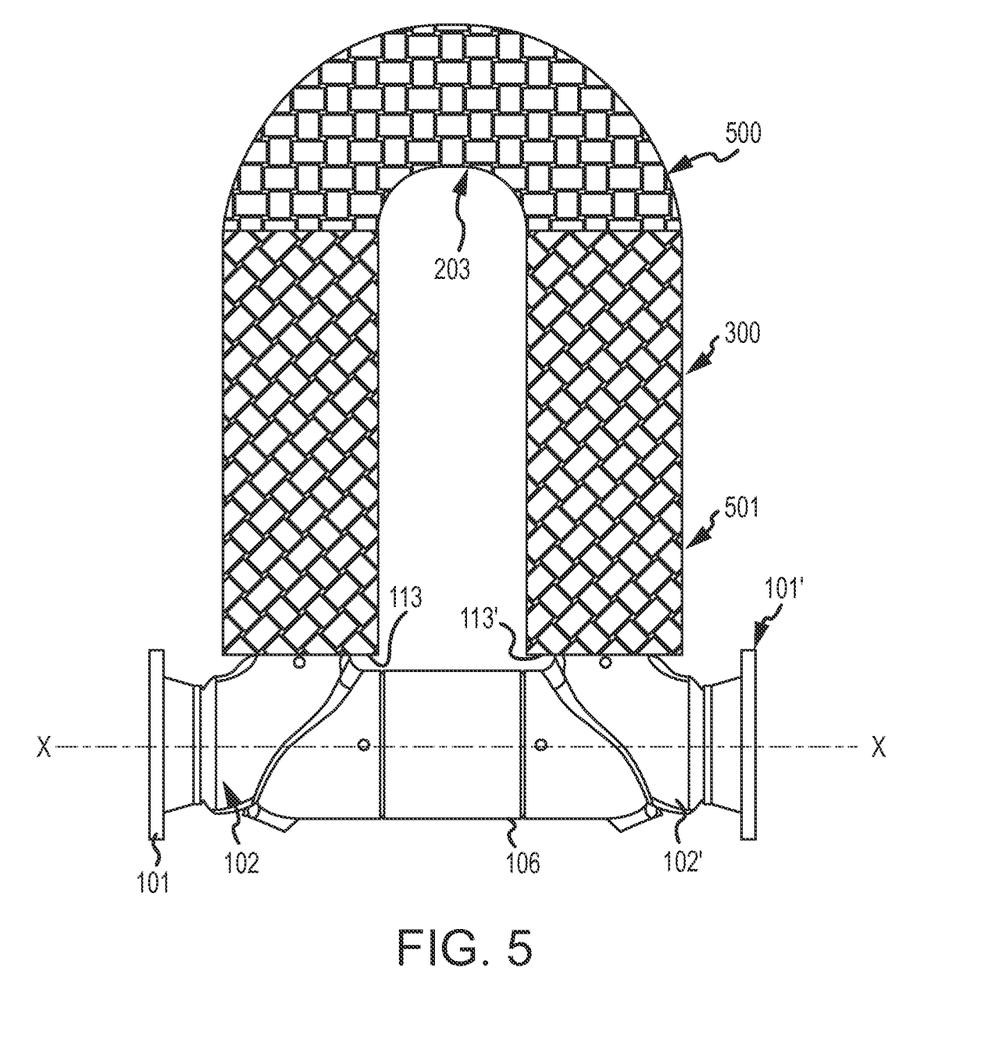
FIG. 5 shows the sensor assembly with the synthetic wrapping the entire outer surface of the case with the fibers oriented in different directions according to an embodiment.

FIG. 5 shows the sensor assembly 10 according to yet another embodiment. In the embodiment shown in FIG. 5, substantially the entire case 200 is wrapped in the synthetic wrap 300. However, the portion 500 of the synthetic wrap 300 proximate the bend region 203 has its fibers oriented in a direction different from the rest 501 of the synthetic wrap. As can be seen, the portions 501 of the synthetic wrap 300 proximate the base of the case 200 have its fibers oriented at approximately 45° with respect to the longitudinal axis X-X of the sensor assembly 10. However, the portion 500 of the synthetic wrap 300 proximate the bend region 203 has its fibers oriented at approximately 90° with respect to the longitudinal axis X-X.

According to an embodiment, the fiber orientation can be chosen to better control and fine tune the vibrational frequencies of the case 200. As is generally known in the art, synthetic fibers are often anisotropic and thus, the modulus of elasticity of the synthetic fibers is direction dependent. Consequently, by orienting the fibers in certain directions, specific vibrational frequencies of the case 200 may be raised or lowered. The specific orientation of the fibers may depend on the particular type of synthetic fiber used, the desired thickness of the synthetic fiber, the desired change in the case's frequency, the number of layers of the fiber, etc. Those skilled in the art can readily appreciate that the desired fiber orientation may be determined experimentally or by finite element analysis, for example. The fibers may be oriented in different directions by rotating the synthetic material prior to application on to the case 200. According to another embodiment, two or more different synthetic materials having differing fiber orientations may be used with different synthetic materials being applied to different regions of the case.

According to another embodiment, the stiffness added to the case 200 by the synthetic wrap 300 can be adjusted by pre-tensioning the synthetic wrap 300. According to an embodiment, this can be accomplished by wrapping the case 200 at an elevated temperature, i.e., higher than ambient temperature or the temperature at which the vibrating meter 5 is anticipated to be operating. By applying the synthetic wrap 300 at an elevated temperature, the synthetic wrap 300 will contract as it cools to tighten further around the case 200. The stiffness added by the contraction of the synthetic wrap 300 can increase the vibrational frequencies of the case 200. According to another embodiment, the pre-tensioning can be accomplished by applying the synthetic wrap 300 to the case 200 while being stretched. The pre-tensioning can increase the compression the synthetic wrap 300 provides to the case 200.

According to yet another embodiment, the thickness of the synthetic wrap 300 can vary depending on the location of the wrap 300 on the case 200. For example, as mentioned above, the bending region 203 of the case 200 is typically the weakest point in the case 200 and thus, typically comprises the pressure bursting point. Therefore, in some embodiments, the synthetic wrap 300 may be wrapped thicker in this region than the remainder of the case 200. In another embodiment, the synthetic wrap 300 can be wrapped thicker at the base of the case 200 near where the case 200 is coupled to the plates 113, 113'. This section of the case 200 is subject to the greatest bending during operation. Therefore, stiffening this region of the case 200 with the synthetic wrap can raise the case's vibrational frequencies.

The embodiments described above provide various examples that teach those skilled in the art how to increase a burst pressure of a vibrating meter's case using a synthetic wrap. The synthetic wrap may comprise a synthetic fiber. The synthetic wrap may be applied to a portion of the case or the entire case. The synthetic wrap may be applied in more than one layer. In embodiments where the synthetic material comprises a synthetic fiber, the fibers of the synthetic wrap may be oriented to adjust the stiffness in a desired direction thereby adjusting one or more natural vibrational frequencies of the case.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other vibrating meters, and not just to the embodiments described above and shown in the accompanying figures. Accordingly, the scope of the embodiments described above should be determined from the following claims.

We claim:

1. A sensor assembly (10) of a vibrating meter (5), comprising:
   one or more fluid conduits (103A, 103B);
   a case (200) surrounding at least a portion of the one or more fluid conduits (103A, 103B); and
   a synthetic wrap (300) applied to at least a portion of the case (200) to increase a natural frequency of the case (200), and the synthetic wrap (300) applied to another portion of the case (200) to lower the natural frequency of the case.

2. The sensor assembly (10) of claim 1, wherein the synthetic wrap (300) is applied to substantially the entire outer surface of the case (200).

3. The sensor assembly (10) of claim 1, wherein the synthetic wrap (300) comprises a synthetic fiber.

4. The sensor assembly (10) of claim 3, wherein fibers of the synthetic wrap (300) are oriented to adjust one or more vibrational frequencies of the case (200).

5. The sensor assembly (10) of claim 3, wherein the synthetic wrap (300) comprises two or more different synthetic fibers.

6. The sensor assembly (10) of claim 1, wherein the synthetic wrap is applied at a first thickness to a first portion of the case and at least a second thickness to at least a second portion of the case.

7. A method for forming a sensor assembly of a vibrating meter including one or more fluid conduits, comprising steps of:
   surrounding at least a portion of the one or more fluid conduits with a case; and
   applying a synthetic wrap to at least a portion of the case to increase a natural frequency of the case, and the synthetic wrap applied to another portion of the case to lower the natural frequency of the case.

8. The method of claim 7, wherein the step of applying the synthetic wrap comprises applying the synthetic wrap to substantially the entire outer surface of the case.

9. The method of claim 7, wherein the synthetic wrap comprises a synthetic fiber.

10. The method of claim 9, wherein the step of applying the synthetic wrap comprises orienting the fibers of the synthetic wrap to adjust one or more vibrational frequencies of the case.

11. The method of claim 9, wherein the synthetic wrap comprises two or more different synthetic fibers.

12. The method of claim 7, wherein the step of applying the synthetic wrap comprises pre-tensioning the synthetic wrap.

13. The method of claim 7, wherein the step of applying the synthetic wrap comprises applying more than one layer of the synthetic wrap.

14. The method of claim 7, wherein the step of applying the synthetic wrap comprises applying the synthetic wrap at a first thickness to a first portion of the case and at least a second thickness to at least a second portion of the case.

* * * * *